United States Patent [19]
Palmer et al.

[11] 3,742,351
[45] June 26, 1973

[54] DIGITAL TEST PROBE WITH SIGNAL LATCHES AND CONDITIONABLE GATING

[75] Inventors: James A. Palmer, Willingboro, N.J.; Richard L. Longcoy, Lansdale, Pa.

[73] Assignee: Nu-Concept Computer Company, Norristown, Pa.

[22] Filed: July 17, 1970

[21] Appl. No.: 55,798

[52] U.S. Cl. .................. 324/72.5, 324/133
[51] Int. Cl. ................ G01r 19/16, G01r 31/02
[58] Field of Search .............. 324/72.5, 51, 133; 340/248 A, 248 B, 248 C, 248 P, 253 P; 307/218, 235; 317/22

[56] References Cited
UNITED STATES PATENTS

| | | | |
|---|---|---|---|
| 3,021,514 | 2/1962 | Regis et al. | 324/133 X |
| 3,482,236 | 12/1969 | Seney | 340/248 C |
| 3,560,798 | 2/1971 | Tenebaum et al. | 317/22 |
| 3,573,782 | 4/1971 | Williams | 340/253 P |
| 3,619,775 | 11/1971 | Naylor et al. | 324/133 X |
| 3,525,939 | 8/1970 | Cartmell | 324/72.5 X |
| 3,437,928 | 4/1969 | Baker et al. | 324/72.5 X |
| 3,543,154 | 11/1970 | Gordon | 324/72.5 X |
| 3,278,900 | 10/1966 | Wood | 307/218 X |

OTHER PUBLICATIONS

Gordon, Gary B., IC Logic Checkout Simplified Hewlett Packard Journal, June 1969, pp. 14–16.

Nicholson, J. O. Switching Circuit Diagnostic Probe IBM Technical Disclosure Bulletin, Vol. 12, No. 4, Sept. 1969.

*Primary Examiner*—Gerard R. Strecker
*Attorney*—Caesar, Rivise, Bernstein & Cohen

[57] ABSTRACT

A test probe for digital electronic circuitry which includes a discriminator for distinguishing between logical low, neutral and logical high voltages. The test probe also includes indicating lamps for displaying the results of the discriminator. Latching means are also provided so that the receipt of a pulse can be stored and a lamp energized to indicate the receipt of the pulse.

7 Claims, 6 Drawing Figures

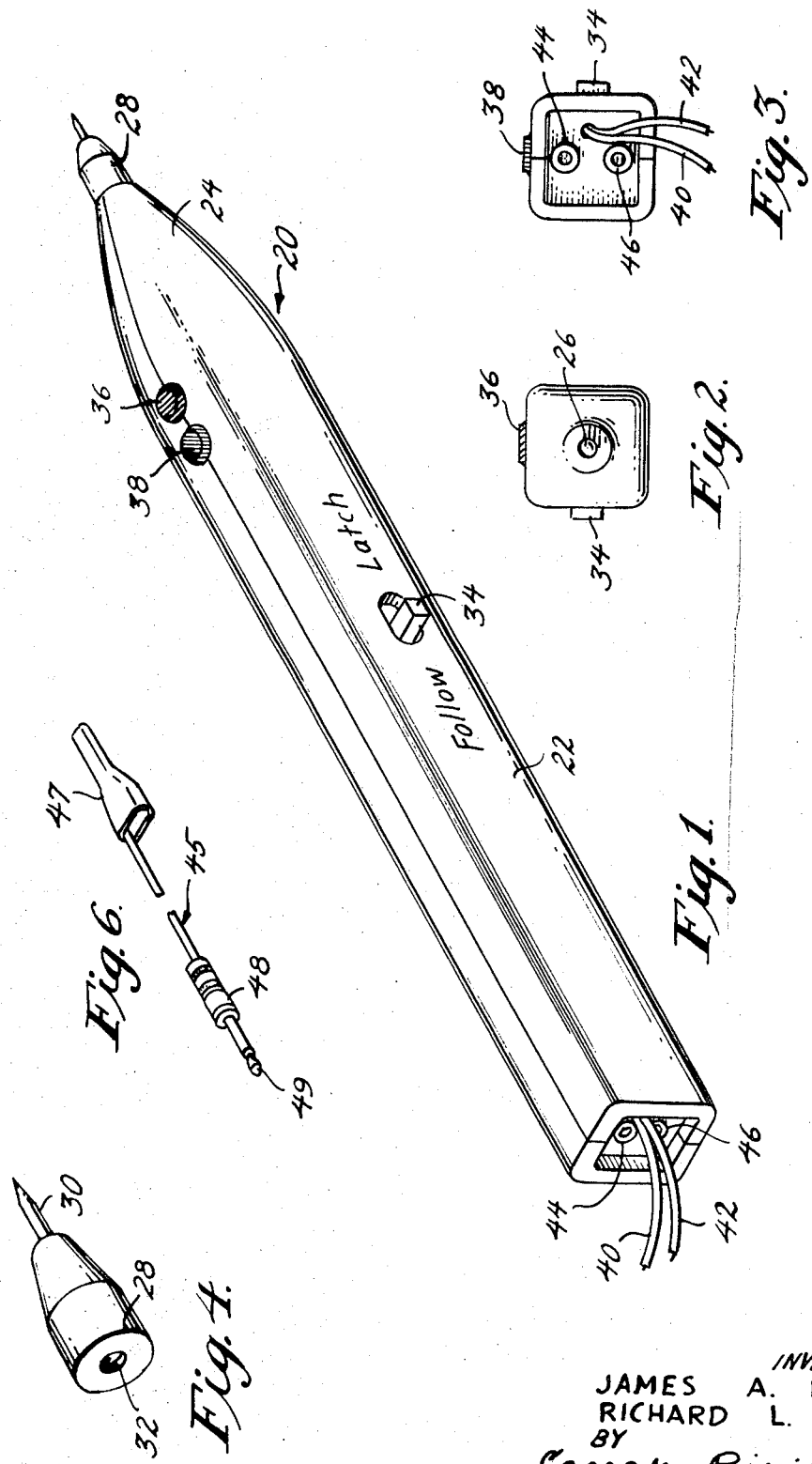

INVENTORS.
JAMES A. PALMER
RICHARD L. LONGCOY
BY
Caesar, Rivise,
Bernstein & Cohen
ATTORNEYS.

DIGITAL TEST PROBE WITH SIGNAL LATCHES AND CONDITIONABLE GATING

This invention relates generally to test probes and more particularly to a test probe for digital electronic circuits.

Presently existing equipment for the checking and testing of digital electronic circuits is either too expensive, impractical or inadequate to test for the operating capability of a digital electronic circuit. For example, most digital electronic circuits, when they are out of order, must be analyzed with an oscilloscope. The oscilloscope provides the necessary circuitry for providing a display of the signals provided throughout the circuitry when the circuit is in operation. However, the oscilloscope is a very expensive piece of equipment and only marginally portable. In addition, practical servicing oscilloscopes cannot display extremely short non-repetitive transient signals.

Simpler probes which have been tried for digital electronic circuitry have proven to be inadequate in that they (a) cannot discriminate between one of the logically-defined levels and the logically-undefined (neutral) level in the digital circuitry; (b) are incapable of testing for a signal which can only be conditionally generated; or (c) cannot indefinitely store the detection of a short transient signal for later interrogation.

It is therefore an object of the invention to overcome the aforementioned disadvantages.

Another object of the invention is to provide a new and improved test probe for digital electronic circuits which includes discriminating means for discriminating between three distinct voltage levels.

Another object of the invention is to provide a new and improved test probe for digital electronic circuitry which includes storage means for remembering the fact that the digital test probe has received a pulse of a predetermined polarity.

Yet another object of the invention is to provide a new and improved digital test probe which enables the detection of conditional signals which are generated only when a predetermined signal is generated in another portion of the circuitry.

Another object of the invention is to provide a new and improved digital probe which is inexpensive to use and simple to operate.

Another object of the invention is to provide a new and improved digital test probe which is functionally designed so that it may be easily used and includes lamps which are provided adjacent the tip of the probe to facilitate visual inspection thereof and determination of the signals present in the circuit tested.

Another object of the invention is to provide a new and improved digital test probe which is comprised of solid state circuitry so that the digital test probe can withstand the normal wear and tear given to the same by a serviceman.

These and other objects of the invention are achieved by providing a test probe for a digital electronic circuit. The probe includes a tip for connection of the probe to the circuit. Means for discriminating between a logical low, neutral and logical high voltage at the top is provided. Output means are also provided which are responsive to the discriminator and includes a first indicator which is energized by detection of a logical low voltage and a second indicator which is energized by detection of a logical high voltage. In addition, latching means are provided to remember the reception of a pulse of either a logical high voltage or a logical low voltage. Additionally, circuitry is provided for gating auxiliary voltages so that the probe will be permitted to detect a logical high or a logical low voltage only when a predetermined logical high or logical low voltage is provided to the gating circuitry.

Other objects and many of the attendant advantages of this invention will be readily appreciated as the same becomes better understood by reference to the following detailed description when considered in connection with the accompanying drawings wherein:

FIG. 1 is a perspective view of a test probe for digital electronic circuitry embodying the invention;

FIG. 2 is a front elevational view of the test probe;

FIG. 3 is a rear elevational view of the test probe;

FIG. 4 is an enlarged perspective view of a probe tip;

FIG. 6 is a perspective view of an auxiliary test lead which is used for conditioning the operation of the test probe.

Referring now in greater detail to the various figures of the drawing wherein similar reference numerals refer to similar parts, a digital test probe embodying the invention is shown generally at 20 in FIG. 1.

Figure 5:
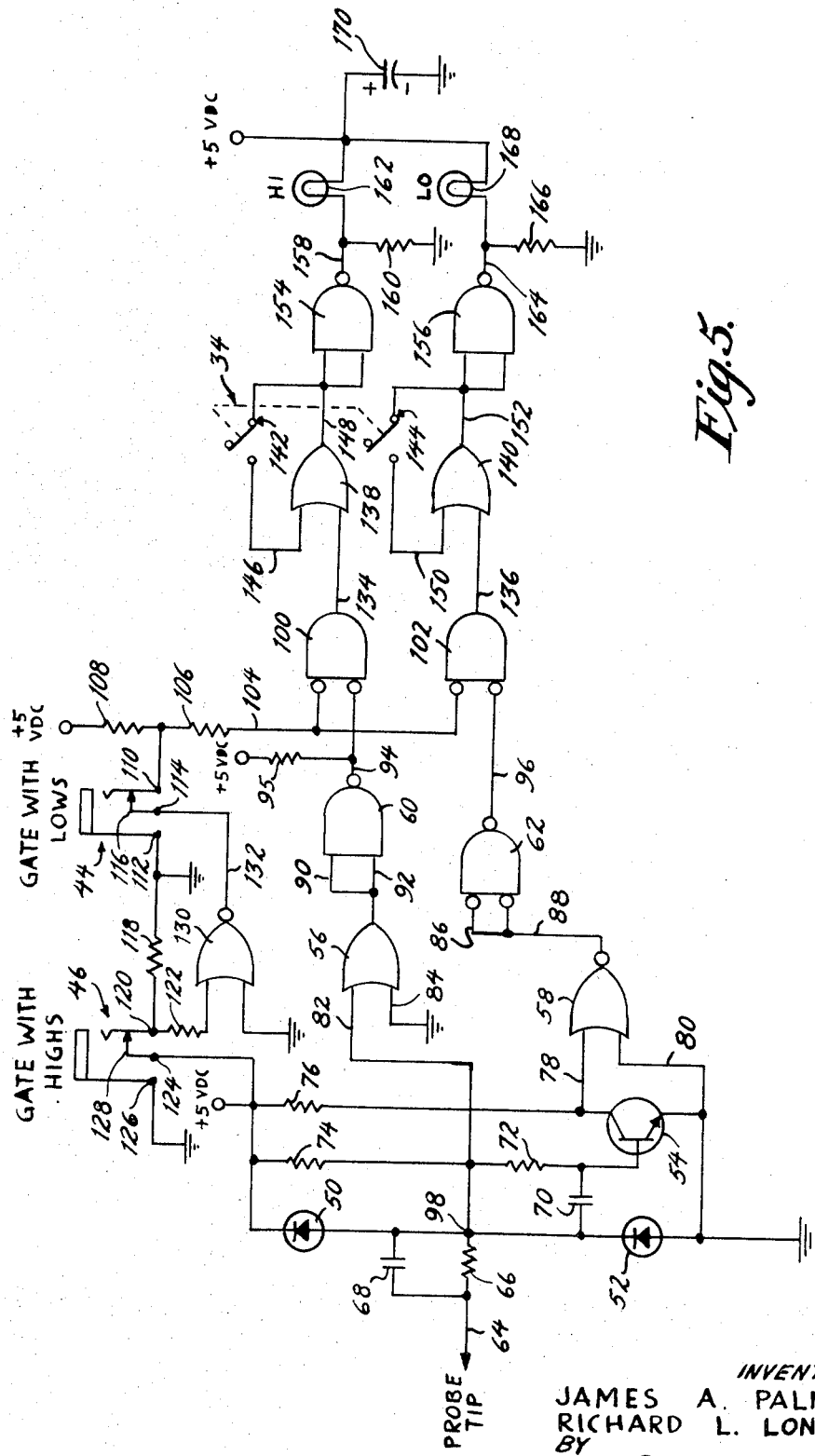
FIG. 5 is a schematic block diagram illustrating the circuitry and logic utilized in the digital test probe.

As best seen in FIG. 1, the digital test probe 20 includes a housing 22 which is elongated and pencil-like in shape so that it can be easily used to reach inaccessible portions of a circuit. The housing 22 is preferably composed of a molded high-impact thermoplastic such as nylon and is substantially rectangular in cross-section and tapers towards its forward end at 24.

As best seen in FIG. 2, at the end of the housing 22, a longitudinally extending threaded stud 26 is provided to threadedly secure and electrically connected the probe tips to the circuitry in the test probe. As best seen in FIG. 4, a probe tip 28 includes a somewhat cylindrical body which is tapered at its forward end and includes an elongated forwardly extending conductive tip 30. The probe tip also includes an opening 32 which is threaded so that it can be secured to the stud 26. The probe tips 28 are removable so that various shapes of probe tips can be used in accordance with the application. For example, probe tips having hook-shaped tips can be used so that the test probe can be hung from a conductor so that reception of a pulse on the conductor during an extended period of time can be detected.

A latch-follow switch 34 is provided in the side of the housing 22 and enables the user of the probe to determine the mode of operation desired for testing. A pair of lenses 36 and 38 are also mounted in the housing and are mounted adjacent to a pair of lamps which are provided on the printed circuit board in the housing 22. Lens 36 is preferably tinted green and lens 38 is preferably tinted red so that the energization of the lamp adjacent thereto causes, respectively, a green or red display.

As best seen in FIG. 3, the test probe 20 includes a pair of leads 40 and 42 which are, respectively, connected to ground and to the positive voltage source in the circuit being tested. Each of the leads 40 and 42 is preferably equipped with an alligator clip for connection of the lead to the signal source of the electronic circuit being tested. A pair of jacks 44 and 46 are also provided which enable connection of the digital test probe 20 via an auxiliary test lead 45 to a conductor in the electrical circuit being tested which enables conditioning of the operation of the digital test probe when either a high or a low digital signal is provided on the conductor.

The auxiliary test lead 45 is best seen in FIG. 6 and includes an insulated alligator clip 47 at one end and a male plug 48 having an isolated plug tip 49. The alligator clip 47 is utilized to connect the lead 45 to a conductor in the tested circuit. The plug 48 is connected to the appropriate jack 44 or 46 in accordance with the necessity to gate the test probe with low or high logical voltages, respectively.

In operation, the digital test probe 20 has its probe tip 28 secured to the end thereof and the lead 40 is connected to ground and lead 42 is connected to the positive voltage source of the electronic circuit to be tested. The probe tip 28 is then placed against the various conductors of the circuit to test for logical highs and logical lows. The digital test probe may now be used in one of the following manners:

1. to signal trace
2. to pulse catch
3. to gate with lows
4. to gate with highs

In the signal tracing mode of operation, the switch 34 is placed adjacent the "Follow" legend. When the probe tip 28 is touched to the conductors in the circuit being tested, the lamp adjacent the green lens 36 is energized when the probe tip voltage is lower than +0.4 volts. The lamp associated with the red lens is lit when the probe tip voltage is greater than +2.4 volts. Neither lamp is lit when the probe tip is not connected to a conductor or if the conductor to which the probe tip is connected stays within the band of +0.4 volts to +2.4 volts.

In the pulse catch mode of operation, switch 34 is placed in the "Latch" position with the switch being placed adjacent the "Latch" legend. In this mode of operation, the lamp associated with the green lens is energized and stays lit after the probe tip voltage drops below +0.4 volts. The lamp associated with the red lens is lit and stays lit after the tip probe voltage rises above +2.4 volts. Neither lamp is lit when the probe tip is not connected to a source or if the source to which it is connected stays within the band of +0.4 volts to +2.4 volts. Thus, if a pulse is detected on the conductor to which the probe tip 28 is connected, it will be enough to energize the lamp 36 or 38 and keep it energized until such time as the leads 40 and 42 are disconnected from the ground and +5 voltage sources or the switch 34 is placed in the "Follow" position.

In the gating with lows mode of operation, the auxiliary lead is connected to the jack 44 at the rear of the probe. The auxiliary lead 45 is then connected to a conductor which conditions the operation of the test probe 20 to accept tip data only when a low signal is provided on the conductor. The test probe can be used in either the signal tracing mode or the pulse catching mode. However, lamps 36 and 38 are not enabled unless a low signal is provided on the conductor to which the auxiliary lead is connected.

The gating with high mode of operation is similar to the gating with low mode of operation except that the auxiliary lead 45 is connected to jack 46 with the clip 47 of the lead connected to the conductor intended to activate the test probe only when a digital high signal is provided on the conductor. Again, the probe is used in either the signal trace or pulse catch mode but it accepts the probe tip data only during those intervals that the auxiliary lead signal is high.

The circuitry of the test probe 20 is seen in FIG. 5. The circuit of the test probe basically includes three sections which are a voltage discriminator portion, a gating portion and a display portion.

The discriminator portion basically comprises an input circuit comprised of diodes 50 and 52, transistor 54, a pair of OR gates 56 and 58, an inverter 60 and an amplifier gate 62. The probe tip is connected to the discriminator circuit via an input lead 64. Input lead 64 is connected to an input circuit comprised of a resistor 66 and a capacitor 68 which are connected in parallel. The resistor 66 and the capacitor 68 are connected at their other end between diodes 50 and 52 and to the base of transistor 54 via capacitor 70 and resistor 72. Diode 50 is connected in parallel with resistor 74 and is connected to the +5 volt D.C. source. The collector of transistor 54 is connected to the +5 volt D.C. source via resistor 76 and to the first input lead 78 of OR gate 58. The emitter of transistor 54 is connected to ground as is input lead 80 of the OR gate 58. The input circuit comprised of resistor 66 and capacitor 68 is also connected to input lead 82 of OR gate 56.

The second input lead 84 of OR gate 56 is connected to ground. THe output of OR gate 58 is connected to the input leads 86 and 88 of amplifier gate 62. The output of OR gate 56 is connected to the input leads 90 and 92 of inverter 60. It should be noted that inverter 60 is comprised of a coincidence gate. However, since the lead lines 90 and 92 are connected together, the coincidence gates acts as an inverter. An analogous situation exists with amplifier gate 62.

It should also be noted that various ones of the input lines and output lines of the coincidence gate and the OR gates throughout the circuit have circles at the junction of the gate with the input or output lead. Where a circle is provided such as on the input to amplifier gate 62, it means that the logical low voltage is required to enable the gate rather than the logical high voltage as is normally required with the gate. That is, in a coincidence gate where two inputs have circles thereat, two logical low voltages are required to enable the gate rather than two logical high voltages. Similarly, with respect to the output leads where the circle is provided on the output lead, it means that when the gate is enabled, a logical low voltage is generated by the gate rather than a logical high voltage.

The output of gates 60 and 62, lines 94 and 96, respectively, are the output lines of the discriminating circuit. The output line 94 is connected to the +5 volt D.C. source via resistor 95. The connection of the output of inverter 60 to the resistor 95 is required by the inverter circuit used.

The output signals on lines 94 and 96, thus, are effectively a two bit code which interprets the analog voltage which is present at the probe tip in accordance with three different ranges of voltage which can be provided at the probe tip. In the range of volts less than +0.4 volts, the output signal on line 94 is logically high and the output signal on line 96 is a logical low. In the neutral range of +0.4 volts to +2.4 volts, a logical high voltage is provided on both lines 94 and 96. When the tip voltage, however, exceeds +2.4 volts, the voltage on output line 94 changes to the logical low and output line 96 remains at a logical high voltage.

Assuming the test probe 20 is connected to both the +5 voltage source and the ground source in the tested electronic circuit, the voltage divider provided by resistor 72 and resistor 74, in conjunction with the base emitter junction of transistor 54, acts to hold the tip voltage at approximately +1.5 volts when the probe tip is not connected to an external source. Junction 98 is normally at approximately +1.5 volts. The input switching threshold of OR gate 56 is +2 volts. Thus, in order to enable OR gate 56, a voltage of +2 volts must be provided on either of lines 82 or 84. Since line 84 is connected to ground and junction 98 is normally at +1.5 volts, gate 56 is normally disabled and, consequently, the logical low voltage on output line 92 is inverted by invertor 60 to the logical high output on line 94 when the probe tip is not connected to an external source.

Similarly, when the voltage at junction 98 is at +1.5 volts, transistor 54 is made conductive by the forward biasing of the base-emitter junction of transistor 54 which is preferably of the NPN type. Accordingly, the collector voltage of transistor 54 is low when the transistor 54 is conductive thereby causing a logical low input to the OR gate 58 thereby maintaining it in a disabled condition.

When OR gate 58 is in the disabled condition, the output voltage is at a logical high which prevents the amplifier gate 62 from being enabled which thereby causes a logical high voltage to be provided on output line 96. It can, therefore, be seen that both lines 94 and 96 are high when the probe tip is either connected to no external source or to a source of voltage between +0.4 volts to +2.4 volts.

When the probe tip is connected to an external source exceeding +2.4 volts, the +2.0 volt input switching threshold of the OR gate 56 is exceeded by the voltage on line 82 which changes to a logical high. This causes OR gate 56 to be enabled which causes the logical high voltage on output line 92 to be converted to a logical low voltage on line 94. Since transistor 54 has its base-emitter junction further forward biased, it remains conductive and, thereby, causes the logical high voltage to be maintained on output line 96.

When the probe tip is connected to an external source of less than +0.4 volts, the current flowing through resistor 74 is diverted from resistor 72 to resistor 66. This causes the input to the base of transistor 54 to go low and the base-emitter junction is thereby back biased cutting off the transistor 54.

The cutting off of transistor 54 causes the high output voltage on the collector thereof to cause gate 58 to be enabled which in turn causes amplifier gate 62 to be enabled. Since amplifier gate 62 is enabled, the output signal on line 96 is a logical low voltage. When amplifier gate 62 is enabled by a logical low voltage at the probe tip, it should be noted that the output signal on line 94 remains a logical high voltage. That is, since the voltage at junction 98 is lowered as a result of a low voltage provided to line 64, OR gate 56 remains disabled and thereby prevents a change in the output signal from inverter 60.

The diodes 50 and 52 act as clamping diodes to protect the circuit against accidental application to the probe tip of a very high positive or negative voltage. That is, the diodes limit the voltage at the instrument side of the resistor to the range of approximately −1 to +6 volts. This permits the voltage at the probe tip to swing in either polarity to levels sufficient to destroy resistor 66 without destroying the remaining portion of the probe.

The input network of resistors 66, 74, and 72, as well as the switching thresholds of the transistor 54 and OR gate 56 sets the limits of the three voltage zones for which discrimination is determined. The three zones are those in the most common use in conventional digital circuitry. That is, the low voltage range is 0 to +0.4 volts, the neutral range is +0.4 to +2.4 volts and the high voltage range is +2.4 to +5.0 volts. The capacitors 68 and 70 are primarily provided to speed up the response of the transistor 54 circuit. That is, the capacitor 70 is provided to compensate for the input capacitance of the transistor 54. Similarly, capacitor 68 provides a speedier response to a change in voltage at the probe tip.

Output lines 94 and 96 of the discriminating portion of the circuit are connected to the gating portion of the circuitry. The gating portion includes a pair of coincidence gates 100 and 102. Lines 94 and 96 represent a first input to each of the coincidence gates 100 and 102, respectively. The second input lines of each of the coincidence gates 100 and 102 is connected to line 104 which is in turn connected to resistor 106. Resistor 106 is connected to resistor 108 and a first terminal 110 of the jack 44.

The jack 44 includes, in addition to terminal 110, a pair of terminals 112 and 114. The terminals 110 and 114 are normally connected together via wiper arm 116 whenever a male plug is not inserted into jack 44. Terminal 114 is also connected to the output of OR gate 130 via line 132. When a male plug is inserted into the jack 44, wiper arm 116 is displaced from the conductor to terminal 110 thereby opening up the conductive path between terminals 114 and 110. However, the insertion of the male plug causes the connection of the auxiliary test lead to terminal 110. Terminal 112 is connected to ground as is resistor 118.

Resistor 118 is connected at its other end to terminal 120 of jack 46 and to resistor 122. Jack 46 includes, in addition to terminal 120, terminals 124 and 126. The jack also includes a wiper arm 128. Jack 46 is similar to jack 44 and, thus, terminals 120 and 124 are normally connected together via wiper arm 128 when a male plug is not inserted into the jack. However, when a male plug is inserted into the female jack 46, the conductive path between terminals 120 and 124 is broken and the auxiliary test lead is connected to terminal 120.

Resistor 122 is connected at its other end to the first input to OR gate 130. The other input of OR gate 130 is connected to ground. The output line 132 of OR gate 130 is connected to terminal 114 of jack 44. The terminal 124 of Jack 46 is connected to the +5 volt D.C. source. The terminal 126 of jack 46 is connected to ground.

In operation, when jacks 44 and 46 are in their normal position without a male plug inserted therein, the coincidence gates 100 and 102 are enabled via a low signal provided on line 104. That is, the +5 volt D.C. source is connected via terminals 124 and 120 of jack 46 to the input of OR gate 130 through resistor 122. Accordingly, OR gate 130 is normally enabled when no probe is inserted into jack 46 thereby causing output line 132 to be in the logical low voltage. This logical low voltage is transmitted via terminals 114 and 110 of jack 44 through resistor 106 to line 104 which thereby maintains a logical low voltage at the input of the coincidence gates 100 and 102. The logical low voltage at the inputs of gates 100 and 102 enables the gates 100 and 102 to be enabled each time a logical low voltage is provided on output lines 94 and 96, respectively, of gates 60 and 62.

As will be seen hereinafter, each time gate 100 is enabled, it causes the lamp associated with the red lens to be energized. Similarly, each time gate 102 is enabled, it causes the lamp associated with the green lens to be energized.

Thus, with no male plug in either of jacks 44 and 46, gates 100 and 102 merely follow the logical result from gates 60 and 62 of the discriminator portion of the circuit.

However, where it is desired to detect for logical high or low voltages, only during the occurrence of a low or high voltage in a different conductor of a circuit tested, the auxiliary test lead is utilized by having the male plug thereof inserted in either jack 44 or jack 46.

As indicated by the legend adjacent jack 44, the auxiliary lead is plugged into jack 44 when it is desired to gate the output of the discriminator circuit with a logical low voltage. The insertion of the male plug into jack 44 causes the terminal 110 of jack 44 to be disconnected from the logical low output voltage of OR gate 130. Terminal 110 is then connected to the auxiliary test lead via the male plug inserted into the jack. Thus, unless a low signal is provided on the conductor to which the auxiliary test lead is connected, a logical low voltage is not applied to the line 104 connected to coincidence gates 100 and 102. Thus, gates 100 and 102 are enabled only when a low input voltage is connected to the auxiliary test lead which is connected to the input jack 44.

When the circuitry is in the gating with high logical voltage mode of operation, the auxiliary test lead is connected into jack 46. The wiper arm 128 is, thus, disconnected from terminal 120 thereby causing the +5 volt D.C. source to be disconnected from the input of OR gate 130 via terminals 120 and 124 of jack 46. Thus, in order for gate 130 to be enabled again, a high voltage must be provided via the auxiliary test lead to terminal 120 of jack 46. The enabling of gate 130 again provides a logical low voltage to gates 100 and 102 to enable the detection of logical high and logical low voltages.

The output of gates 100 and 102 are provided on output lines 134 and 136, respectively, to the display portion of the circuitry. The display portion of the circuitry includes a pair of OR gates 138 and 140 which enable the signal trace mode of operation or the pulse catch mode of operation in accordance with the disposition of the latch-follow switch 34.

Switch 34 comprises a pair of switching elements 142 and 144 which are shown in the open position in FIG. 5. Input line 146 of OR gate 138 is connected to the output line 148 of OR gate 138 via switching element 142. Similarly, input line 150 of OR gate 140 is connected via switching element 144 to the output line 152 of OR gate 140. When the switching elements 142 and 144 are open as shown, the switch 34 is in the follow position. When elements 142 and 144 are closed by switch 34, the switch is in the latched position.

When switches 142 and 144 are closed, the OR gates 138 and 140 act in a bistable manner so that both these OR gates remain disabled until a logical high voltage is provided by either of gates 100 or 102 to enable the gates. When gate 138 is enabled, the output line 148 is connected via switching element 142 to input line 146 which thereby maintains the OR gate 138 in an enabled condition even though the signal on line 134 becomes a logical low signal. The operation of OR gate 140 is identical.

The output line 148 of OR gate 138 is connected to a coincidence gate 154 which is connected as an inverter and OR gate 140 is connected via output line 152 to a coincidence gate 156 which is also connected as an inverter.

The output line 158 of inverter 154 is connected to ground via resistor 160 and to lamp 162. Output line 164 of inverter 156 is connected to ground via resistor 166 and to lamp 168. The other terminals of lamps 162 and 168 are each connected to the +5 volt D.C. source and to a capacitor 170. Capacitor 170 is connected at its other side to ground.

Resistors 160 and 166 act to preheat the lamps 162 and 168 so that when either the inverter driver 154 or 156 is enabled, the preheated and, thus, high resistance filament of lamp 162 or 168, respectively, will not cause destructive current to flow in the inverter driver.

In operation, it can be seen that when coincidence gate 100 is enabled, a logical high voltage is provided on line 134 which causes the enabling of OR gate 138. The enabling of OR gate 138 causes the output of line 148 to have a logical high voltage signal thereon which causes the inverter 154 to be enabled and thereby provide a logical low voltage to lamp 162. This causes the flow of current from the +5 volt D.C. source through the lamp 162 and thereby causes energization thereof. When the switch 34 is in the "Follow" position, lamp 162 remains energized as long as gate 100 is enabled. When the switch 34 is in the closed or latched position, as soon as gate 100 becomes enabled, lamp 162 is energized and remains energized until such time as the switch 34 is opened or the +5 volt D.C. source is removed from the circuitry.

Lamp 168 is similarly energized when AND gate 102 is enabled. In the "Follow" position of switch 34, lamp 168 remains energized as long as gate 102 remains enabled. In the "Latch" position of switch 34, lamp 168 is energized as soon as gate 102 is enabled and remains energized until such time as switch 34 is opened or the +5 volt D.C. source is removed.

It can therefore be seen that a new and improved digital test probe has been provided. The test probe enables the discrimination between logical high, logical low and neutral voltages. Moreover, where pulses of short duration are being detected, the latching circuitry enables a continuous display indicative of either a logical high or logical low voltage pulse having been generated by the circuit being tested. Thus, if the serviceman turns his attention from the digital test probe for a split second, he will not have to be afraid that he will miss the receipt of a pulse.

Moreover, the digital test probe enables each of the aforementioned conditions to be detected only during predetermined conditions in a different conductor lead in the tested circuit. Thus, if the test is made only when a logical low voltage is present on the conductor lead, the auxiliary test lead is connected to jack 44. When the condition is a high logical voltage, the auxiliary test lead is connected to jack 46.

Without further elaboration, the foregoing will so fully illustrate our invention that others may, by applying current or future knowledge, readily adapt the same for use under various conditions of service.

What is claimed as the invention is:

1. A portable test probe for digital electronic circuits, said probe being housed in an elongated pencil-like housing, said probe including a tip for connection of said probe to said circuits, means for discrimination between logical low, neutral and logical high voltages at said tip, and output means responsive to said discriminator including a first indicator which is energized by detection of a logical low voltage and a second indicator which is energized by detection of a logical high voltage and gating means connected between said tip and said discriminator for conditioning energization of said indicators, said gating means having inputs which are connectable to a different voltage source within the same circuitry that said tip is connected so that said probe can test for a combination of simultaneously generated signals at said tip and said different voltage source, one of said inputs being connected to said gating means so that only a logical low voltage connected thereto conditions said output means to be responsive to said tip and the other of said inputs being connected to said gating means so that only a logical high voltage connected thereto conditions said output means to be responsive to said tip.

2. The test probe of claim 1 and further including latching means responsive to said discriminator for maintaining the energization of said indicators so that said indicators are not de-energized as soon as said logical low and high voltages are terminated.

3. A portable test prove for digital electronic circuits, said probe being housed in an elongated pencil-like housing, said probe including a tip for connection of said prove to said circuits, means for discrimination between logic low, neutral and logic high voltage at said tip and output means responsive to said discriminator including a first indicator which is energized by detection of a logic low voltage and a second indicator which is energized by detection of a logic high voltage, said probe further including latching means connected to said first and second indicators for maintaining energization of said indicators even after the said voltages are terminated and switching means for selectively making said latching means inoperative so that said indicators can follow the voltages at said tip of said probe, said latching means maintaining energization until manually deenergized.

4. The test probe of claim 3 wherein said latching means includes at least one OR gate having a connection between the inputs thereof and one of the outputs of said gate via said switch.

5. The test probe of claim 3 wherein said probe includes gating means responsive to said tip voltages and adapted to condition the enablement of said display means in accordance with a voltage applied to said gating means.

6. The test probe of claim 5 wherein said gating means includes an input which is adapted to enable said gating means only upon receipt of a logical low voltage signal.

7. The test probe of claim 5 wherein said gating means includes an input which is adapted to enable said gating means only upon receipt of a logical high voltage signal.

* * * * *